Feb. 2, 1965 D. J. SIKORRA 3,168,709
STABILIZED TRANSISTOR DIFFERENCE AMPLIFIER
Filed Dec. 14, 1960
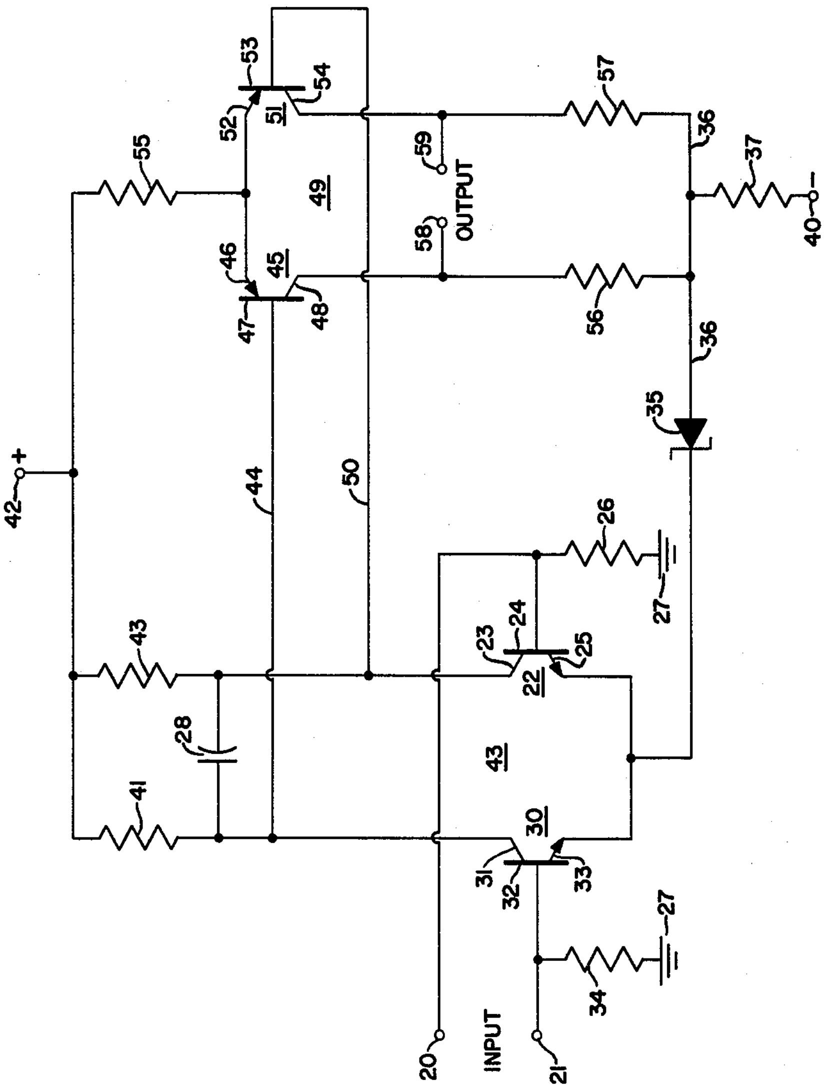
*INVENTOR.*
DANIEL J. SIKORRA
BY Roger W. Jensen
ATTORNEY

United States Patent Office 3,168,709
Patented Feb. 2, 1965

3,168,709

STABILIZED TRANSISTOR DIFFERENCE AMPLIFIER

Daniel J. Sikorra, Champlin, Minn., assignor to Honeywell Inc., a corporation of Delaware Filed Dec. 14, 1960, Ser. No. 75,762
7 Claims. (Cl. 330—30)

This invention relates to an improvement in amplifiers and more particularly to a means for stabilizing the operating point of a transistorized difference amplifier. A difference amplifier is a device the output of which is proportional to the algebraic difference of the input signals applied thereto.

It is well known in the art that in transistor amplifiers the operating point tends to change with changes in temperature, due to the change in collector leakage current with temperature.

It is one object of this invention, therefore, to provide a transistorized amplifier having a stable operating point.

Another object of this invention is to provide a transistorized amplifier wherein the effects of collector leakage current variation with temperature are minimized.

These and other objects of my invention will become apparent to those skilled in the art on consideration of the accompanying specification, claims, and drawing of which the single figure is a schematic diagram of an embodiment of this invention.

Referring to the figure there is shown a difference amplifier having a pair of input terminals 20 and 21. Input terminal 20 is directly connected to a base 24 of a current control device, in this case a transistor 22. Transistor 22 further has a collector 23 and an emitter 25. Base 24 is also connected by means of a resistor 26 to a common conductor 27, in this case ground. Input terminal 21 is directly connected to a base 32 of a transistor, or similar current control device, 30, and by means of a resistor 34 to ground 27. Transistor 30 further has a collector 31 and an emitter 33.

Emitter 33 of transistor 30 is connected directly to emitter 25 of transistor 22. Emitters 33 and 25 are further connected by means of a voltage regulating means, in this case a Zener diode 35, a conductor 36 and a resistor 37 to a negative source of energizing potential 40.

Collector 31 of transistor 30 is connected by means of an impedance, in this case a resistor 41, to a positive source of energizing potential 42. Collector 23 of transistor 22 is connected by means of a resistor, or similar impedance, 43 to the positive potential source 42. Capacitor 28 is connected directly between collectors 23 and 31 of transistors 22 and 30 to minimize the possibility of high frequency oscillation. Transistors 22 and 30 and their associated circuitry comprise a first difference amplifier 43.

Collector 31 of transistor 30 is connected by means of a conductor 44 to a base 47 of a transistor 45. Transistor 45 further has an emitter 46 and a collector 48. Collector 23 of transistor 22 is further connected by means of a conductor 50 to a base 53 of a transistor 51. Transistor 51 further has an emitter 52 and a collector 54. Emitter 52 of transistor 51 is connected directly to emitter 46 of transistor 45. Emitters 46 and 52 are further connected by means of a resistor 55 to the positive potential source 42. Collector 48 of transistor 45 is connected by means of a resistor 56 to conductor 36. Collector 54 of transistor 51 is connected by means of a resistor 57 to conductor 36. Transistors 45 and 51 comprise a second difference amplifier 49. Collector 48 of transistor 45 is further connected to a first output terminal 58. Collector 54 of transistor 51 is further connected to a second output terminal 59.

*Operation*

In considering the operation of the circuit of the figure assume that initially there is no input signal at input terminals 20 and 21. During this condition transistors 22, 30, 45, and 51 will be conducting some quiescent value of operating current.

The current path for the D.C. operating current of transistor 22 is from the positive source 42 through resistor 43, collector 23 to emitter 25 of transistor 22, Zener diode 35 and resistor 37 to the negative supply 40. The D.C. operating current path for transistor 30 is from the positive source 42, through resistor 41, collector 31 to emitter 33 of transistor 30, Zener diode 35 and resistor 37 to the negative supply 40. Similarly the D.C. path for transistor 45 is from the positive source 42 through resistor 55, emitter 46 to collector 48 of transistor 45, resistor 56, and resistor 37 to negative source 40, while the D.C. path for transistor 51 is from source 42 through resistor 55, emitter 52 to collector 54 of transistor 51, resistor 57, and resistor 37 to source 40.

With no input signal the emitters 25 and 33 of transistors 22 and 30 will be at substantially ground potential, since the bases 24 and 32 of transistors 22 and 30 are very nearly at ground potential and since there is a relatively small volt drop across the base to emitter junction of the transistors when conducting. Since the emitters 25 and 33 of transistors 22 and 30 are fixed at substantially ground potential and since the volt drop across Zener diode 35 is substantially constant, conductor 36 is at a substantially fixed potential. Furthermore, since resistor 37 is connected between two substantially fixed potential points, that is, conductor 36 and the negative potential source 40, the volt drop across resistor 37 will remain substantially constant and therefore the current through resistor 37 will also remain constant.

Assume now that the collector leakage current of transistors 22, 30, 45, and 51 tends to increase due to an increase in temperature. The leakage current path for transistor 30 is from the positive potential source 42, through resistor 41, collector 31 to base 32 of transistor 30, and resistor 34 to ground. The leakage current path for transistor 22 is from the positive potential source 42, through resistor 43, collector 23 to base 24 of transistor 22, and resistor 26 to ground. The leakage current path for transistor 45 is from the positive potential source, through resistor 41, conductor 44, base 47 to collector 48 of transistor 45, resistor 56, and resistor 37 to the negative potential source 40. Similarly, the leakage current path for transistor 51 is from the positive potential source 42 through resistor 43, conductor 50, base 53 to collector 54 of transistor 51, resistor 57, and resistor 37 to the negative potential source 40.

It can be seen from the above description that the leakage currents for transistors 22, 30, 45, and 51 flow through resistors 41 and 43 respectively. An increase in the leakage currents of these transistors will increase the voltage dropped across resistors 41 and 43 and the volt drop will be of a polarity such as to increase the conductance of transistors 45 and 51. If transistors 45 and 51 conduct harder then more current will flow from potential source 42 through resistor 55, emitter 46 to collector 48 of transistor 45, resistor 56, and resistor 37 to the negative potential source 40, and from the potential source 42 through resistor 55, emitter 52 to collector 54 of transistor 51, resistor 57, and resistor 37 to negative potential source 40. However, since, as explained before, the current through resistor 37 must remain substantially constant, if transistors 45 and 51 increase in conduction then the current flow through diode 35 and hence through transistors 22 and 30 must decrease in order to maintain the current through resistor 37 constant. However, since the conduction current for transistors 22 and 30 flows through resistors 43 and 41 respectively, if transistors 22 and 30 decrease in conduction then the current flow through resistors 43 and 41 must also decrease. If the current flow through resistors 41 and 43 decreases then the potential on conductors 44 and 50 will become more positive. This more positive potential on conductors 44 and 50 tends to bias transistors 45 and 51 so that these transistors decrease their conduction and return to their original operating point. In other words, the amplifier utilizes the "common mode" gain of the second stage to regulate its own quiescent current against the power supply reference, despite leakage change disturbances.

Assume now that an input difference signal is supplied to input terminals 20 and 21 such that terminal 21 is positive and terminal 20 is negative. This input signal will be coupled to transistors 22 and 30 and will cause transistor 30 to increase conduction and transistor 22 to decrease conduction. The decrease in conduction of transistor 22 is approximately equal to the increase in conduction of transistor 30, thus resulting in the total current through diode 35 remaining substantially constant.

The increase in conduction through transistor 30 results in conductor 44 going more negative while the decrease in conduction of transistor 22 results in conductor 50 going more positive. These changes in polarity on conductors 44 and 50 cause transistors 45 and 51 to change conduction, the conduction of transistor 45 increasing while the conduction of transistor 51 decreases by substantially the same amount. The increase in conduction of transistor 45 produces a larger volt drop across resistor 56, while the decrease in conduction of transistor 51 produces a smaller volt drop across resistor 57. This change in the volt drops across resistors 56 and 57 produces the difference output across output terminals 58 and 59.

It can be seen from the above discussion that the presence of an input signal does not effect the constant current flow through resistor 37 since the two halves of each of the difference amplifiers work in opposition to each other, that is when one half of the difference amplifier increases in conduction the other half decreases in conduction by substantially the same amount thus leaving the total current substantially constant.

While I have shown input terminals 20 and 21 connected across the bases of transistors 30 and 22, it is to be understood that this invention could also be practiced by applying the input signal between terminal 21 and ground or between terminal 20 and ground.

It is to be understood that while I have shown a specific embodiment of my invention, this is for the purpose of illustration only and that my invention is to be limited solely by the scope of the appended claims.

I claim as my invention:

1. Apparatus of the class described comprising: first, second, third, and fourth current control means each having common output, and control electrodes; first and second impedance means respectively connecting the output electrodes of said first and second current control means to a first source of energizing potential; means connecting the common electrodes of said third and fourth current control means to said first source of energizing potential; third impedance means having first and second terminals; fourth and fifth impedance means respectively connecting the output electrodes of said third and fourth current control means to the first terminal of said third impedance means; means connecting the second terminal of said third impedance means to a second source of energizing potential; voltage regulating means connecting the common terminals of said first and second current control means to the first terminal of said third impedance means; means connecting the output electrodes of said first and second current control means respectively to the control electrodes of said third and fourth current control means; means connecting the control electrodes of said first and second current control means to a voltage reference means; and means for connecting the control electrodes of said first and second current control means to a source of input signals.

2. Apparatus of the class described comprising: a first and second direct coupled difference amplifiers, said second difference amplifier having an impedance in series with the D.C. output thereof so that the quiescent operating current of said second amplifier flows through said impedance; and voltage regulating means connecting the D.C. output of said first difference amplifier to said impedance so that the quiescent operating current of said first amplifier also flows through said impedance, said regulating means further holding the voltage across said impedance constant so that the operating points of said first and second amplifiers remain stable.

3. Apparatus of the class described comprising: first and second direct coupled difference amplifiers each having a D.C. input and output; means connecting the input of said first difference amplifier to a first source of energizing potential; means connecting the input of said second difference amplifier to said first potential source; impedance means connecting the output of said second difference amplifier to a second source of energizing potential so that the D.C. energizing current for said second amplifier flows through said impedance; and voltage regulating means connecting the output of said first difference amplifier to said impedance means so that the D.C. energizing current for said first amplifier also flows through said impedance, said voltage regulating means further holding the voltage across said impedance substantially constant so that the D.C. operating points of said first and second difference amplifiers remain fixed.

4. Apparatus of the class described comprising: first and second difference amplifiers; means connecting said first amplifier to said second amplifier so that an increase in the quiescent operating current of said first amplifier will produce an increase in the quiescent operating current of said second amplifier; impedance means; means connecting said second difference amplifier to said impedance means so that the quiescent operating current of said second amplifier flows through said impedance means; and regulating means connecting said first difference amplifier to said impedance means so that the quiescent operating current of said first amplifier also flows through said impedance means, said regulating means further holding the current through said impedance means substantially constant.

5. Apparatus of the class described comprising: first, second, third, and fourth semiconductor means each having common, output, and control electrodes; first and second impedance means respectively connecting the output electrodes of said first and second semiconductor means to a first source of energizing potential; means connecting the common electrodes of said third and fourth semiconductor means to said first source of energizing potential; third impedance means having first and second terminals; fourth and fifth impedance means respectively connecting the output electrodes of said third and fourth semiconductor means to the first terminal of said third impedance means; means connecting the second terminal of said third impedance means to a second source of energizing potential; Zener diode regulating means connecting the common terminals of said first and second semiconductor means to the first terminal of said third impedance means; means connecting the output electrodes of said first and second semiconductor means respectively to the control electrodes of said third and fourth semiconductor means; means connecting the control electrodes of said first and second semiconductor means to a voltage reference means; and means connecting the control electrodes of said first and second semiconductor means to a source of input signals.

6. Apparatus of the class described comprising: first and second direct coupled difference amplifiers; impedance means; means connecting said second difference amplifier to said impedance means so that the quiescent operating current of said second amplifier flows through said impedance means; and Zener diode regulating means connecting said first difference amplifier to said impedance means so that the quiescent operating current of said first amplifier also flows through said impedance means, said regulating means further holding the current through said impedance means substantially constant.

7. Apparatus of the class described comprising: first and second difference amplifiers; means connecting said first difference amplifier to said second difference amplifier so that the operating current of the second amplifier normally varies directly with the operating current of said first amplifier; impedance means connected to said first and second difference amplifiers so that the operating currents of both of said amplifiers flows through said impedance means; and means connected to said impedance means for maintaining a substantially constant current through said impedance means.

References Cited in the file of this patent

UNITED STATES PATENTS

| | | |
|---|---|---|
| 2,714,702 | Shockley | Aug. 2, 1955 |
| 2,780,682 | Klein | Feb. 5, 1957 |
| 3,003,113 | MacNichol | Oct. 3, 1961 |

OTHER REFERENCES

Slaughter: "Feedback Stabilized Transistor Amplifier," Electronics, May 1955, pages 174–175.